United States Patent Office 2,721,227
Patented Oct. 18, 1955

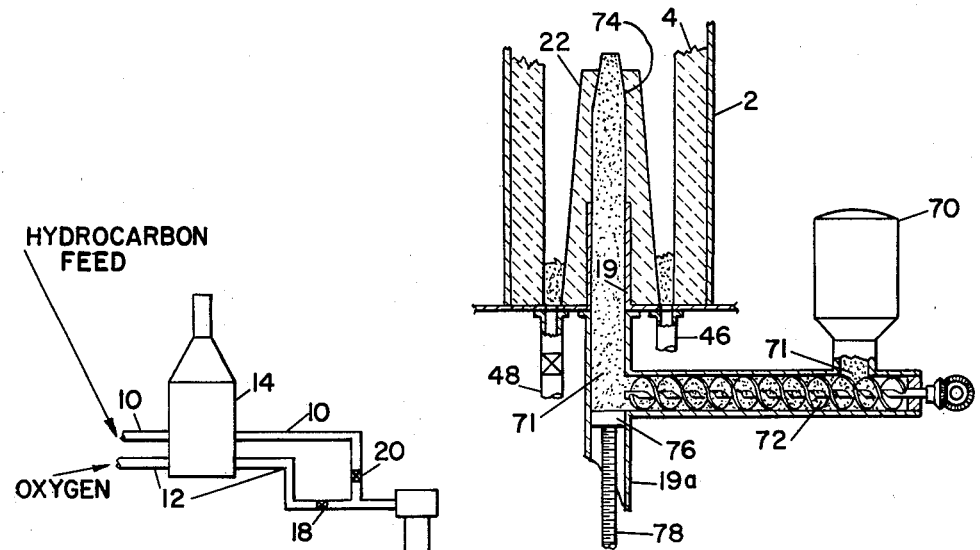
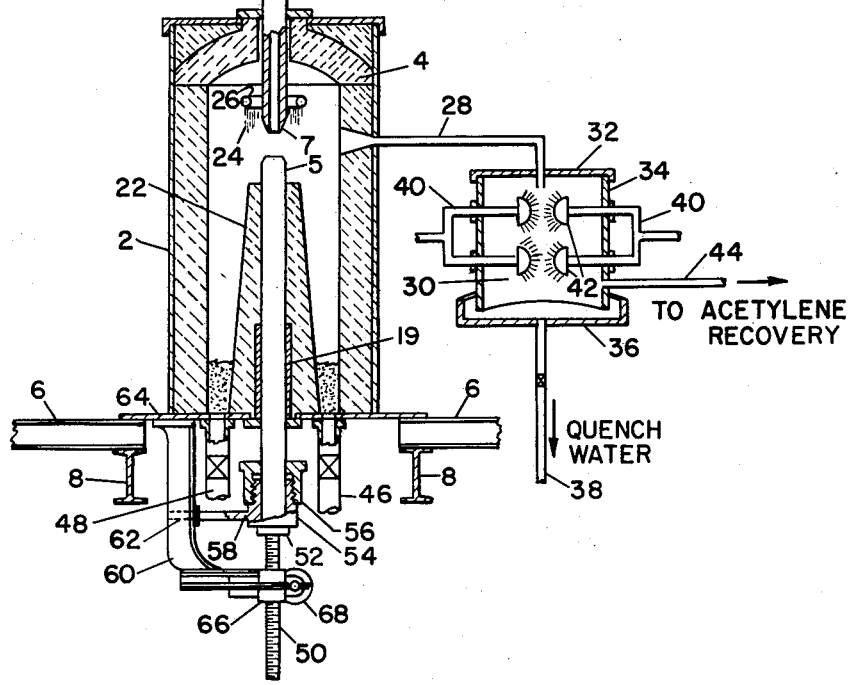

2,721,227

METHOD AND APPARATUS FOR MAKING ACETYLENE

Richard Mungen, Tulsa, Okla., assignor to Stanolind Oil and Gas Company, Tulsa, Okla., a corporation of Delaware Application July 2, 1951, Serial No. 234,736

9 Claims. (Cl. 260—679)

This invention relates to an improved method and apparatus for the conversion of hydrocarbons. More particularly, it is concerned with an improved process and apparatus for producing acetylene from normally gaseous or liquid hydrocarbons.

It is an object of my invention to produce acetylene by cracking other normally gaseous or liquid hydrocarbons wherein the temperature at which the cracking reaction occurs is accurately and readily controlled. It is a further object of my invention to produce acetylene from normally gaseous and liquid hydrocarbons by effecting said cracking reaction on the surface of massive carbon such as, for example, on the surface of a carbon rod or on the surface of a compressed carbon mass. It is a still further object of my invention to provide a novel furnace or reactor design capable of accomplishing the foregoing as well as other objects.

My invention is illustrated by the accompanying drawings wherein Figure 1 shows a reactor furnace design adapted for carrying out the process of this invention. Figure 2 is a modification thereof having a continuous feeding means whereby powdered or finely ground carbon may be employed in a physical form suitable for use in my invention. Referring to Figure 1, 2 is the outer metal wall of a furnace or reaction chamber having therein a refractory lining 4. The furnace is shown as resting on a suitable support such as, for example, beams 6 and 8. The surface of carbon rod 5 is brought to a temperature of from about 2000° to 3000° F. by contact with a flame from burner 7 supplied with a combustible mixture of air or oxygen and a suitable hydrocarbon such as, for example, natural gas. The hydrocarbon and oxygen in lines 10 and 12, respectively, are both pre-heated in heater 14, the hydrocarbon being brought to a temperature not in excess of about 1000° to 1200° F. and the temperature of the air or oxygen being not more than about 600° F. These separately heated streams are injected into mixing chamber 16 into which they are introduced in the proper proportions by regulation of valves 18 and 20. Under the conditions thus provided the gases ignite and contact of the resulting flame on the surface of carbon rod 5 is continued until the temperature of the latter reaches at least about 2000° F. Thereafter the introduction of oxygen is halted by cutting off the flow thereof at valve 18 and injection of hydrocarbon feed through line 10 at about 1000° F. is continued until the temperature of that portion of carbon rod 5 protruding above refractory support 22 falls to about 1600° F. The cycle is then repeated. Combustion occurs at or near the top of support 22 which is secured at the base to the furnace by means of sleeve 19 integral with the base of the furnace body. During the injection of hydrocarbon feed and subsequent cracking thereof on the hot carbon surface to produce acetylene and other valuable products, a shower or curtain of steam 24 surrounding carbon rod 5 from spray 26 serves to effect a rapid quenching of the products resulting from the cracking step. The volume inside steam curtain 24 is purposely made as small as possible in order to reduce the residence time of the products resulting from the cracking step inside the curtain. The jet of hydrocarbon feed striking carbon rod 5 spreads out radially over the hot surface thereof and the resulting gaseous combustion products pass through steam curtain 24. These products are then taken from the furnace into a quenching unit and the acetylene recovered therefrom in accordance with known procedures. Preferably the hot products resulting from the cracking step are withdrawn from the furnace through pipe 28 and introduced into a secondary quenching unit 30 where the temperature of said products is reduced to 212° F. or below. The unit or quench box 30 is comprised of a top plate 32 which serves as a support for pipe 28, side walls 34, and open base 36. Base 36 is a container for the quench water and serves as a liquid seal for the unit. Accumulated water is periodically or continuously withdrawn through pipe 38. The quench box may be of any desired shape and is shown herein as comprising a cylindrical wall of steel or any other suitable material. The unit 30 is provided with a plurality of water lines 40 each having a spray head 42. These spray heads are positioned along the vertical axis of the effluent reaction gas stream and when in operation serve to reduce the temperature of the gaseous products rapidly to or below the boiling point of water. The cooled gases, including acetylene, are withdrawn from unit 30 through line 44 and acetylene recovered therefrom and compressed in accordance with methods outside the scope of my invention.

As operation of the furnace proceeds, ash from the burning of carbon rod 5 falls to the base of the reactor and is removed therefrom by means of lines 46 and 48. Carbon rod 5 and its operating rod 50 are connected through a housing 52 which is extended at 54 by means of nut 56 to form a split sleeve into which carbon rod 5 is snugly fitted. This assembly, including housing 52, is supported by steel rod 64 of a bracket, arm 60 of which is provided with a sleeve 66 guiding feeding rod 50 into contact with carbon rod 5. As the latter is burned down toward the face of support 22, feeding rod 50 forces additional carbon into the burning zone, said feeding rod being driven by an automatic feeding device generally indicated at 68.

Figure 2 is a fragmentary view, partly in section, of a modification of the apparatus shown in Figure 1. Thus, in Figure 2, ground coke, coal, or other suitable carbonaceous material is mixed with a heavy hydrocarbon binder in hopper 70. The resulting mixture 71 of finely ground carbon and hydrocarbon binder flows into an extension 19a of sleeve 19 by means of screw conveyor 72 and thence into channel 74. The upper portion of channel 74 is tapered in order that the aforesaid carbon mixture may be compressed and extruded into the reaction zone. This mixture of hydrocarbon and ground carbon is fed to the reaction zone by piston 76 driven by rod 78 which is actuated by means of an automatic feeding device, not shown, but similar in construction to that illustrated in Figure 1.

In producing acetylene in accordance with my invention, contact times of not more than about 0.01 second are generally required for light hydrocarbons. With a massive carbon surface approximately one foot in diameter, such as is provided by the apparatus shown in either Figures 1 or 2, gas velocities of 100 to 500 feet per second result in contact times of the order stated above. Slightly higher contact times at similar velocities are generally required for the heavier hydrocarbon feeds.

One of the outstanding advantages of my invention resides in the fact that it provides an extremely hot surface on which a wide variety of hydrocarbon materials may be converted to acetylene. The massive carbon surface may be heated to temperatures of from 3000° to about 4000° F., and maintained at those levels for extended periods of time without interfering in any way with the operation of the unit. With conventional apparatus for generating acetylene, the refractories employed are incapable of withstanding temperatures of this magnitude over long periods. Thus, my invention provides an excellent means whereby hydrocarbons can be converted to acetylene under conditions which permit of a very high efficiency in heat transfer. Reactions dependent upon good heat transfer conditions obviously are much more effective and efficient on the hot massive carbon surface provided by my invention than are the gas phase cracking operations heretofore proposed for the manufacture of acetylene. As mentioned above, my invention makes possible the utilization of wide variety of hydrocarbon materials which may be employed for conversion to acetylene. For example, the free carbon in the hot surface on which the reaction occurs enters into reaction with hydrogen liberated by the cracking of more highly saturated hydrocarbons to produce at least part of the total acetylene formed, thus rendering possible the utilization of saturated hydrocarbons as a starting material in the process of my invention.

Generally, I have found it desirable to operate under conditions such that the flows of oxygen and hydrocarbon feed are intermittent. The length of the cycle to give optimum cracking and conversions to acetylene will be found to vary and, to a large extent, as previously indicated, depends upon the composition of the hydrocarbon feed. It will be apparent to those skilled in the art to which the present invention relates that numerous modifications thereof may be devised without departing from the scope of said invention. Thus, in accordance with one variation of the procedure just described, liquid hydrocarbons may be jetted onto the hot massive carbon surface from above or injected through a central channel in the compressed carbon mass or carbon rod. In carrying out my invention in this manner, the carbon rod made, for example, from powdered coal or coke, may be extruded into the reactor with a suitable opening in the center of the rod through which the hydrocarbon feed is injected.

The principles of my invention may likewise be employed in modifications in which oxygen and hydrocarbon streams are continuously jetted or directed onto the surface of hot massive carbon. For example, the hydrocarbon stream may be fed onto the surface of the hot carbon through a channel in the carbon body. A jet of oxygen is directed onto the top surface of the carbon from a flexible metal conduit, or the equivalent thereof, in such a manner that the stream of oxygen strikes the carbon surface at a point directly behind the area in which cracking of the hydrocarbon last occurred. In the modification mentioned above, as the hydrocarbon is cracked and converted to acetylene by contacting the hot carbon surface, the latter is cooled below suitable cracking temperature, i. e., about 1600° F.; however, the carbon surface is reheated to cracking temperature by injecting an oxygen containing gas, in the manner mentioned above, onto the cooled surface. This cycle may be repeated all around the surface of the hot carbon thereby resulting in the continuous production of acetylene without having to alternately turn off the oxygen and hydrocarbon streams. Also, in accordance with my invention, acetylene may be continuously produced by directing oxygen and hydrocarbon streams onto the hot carbon surface at high velocities. In order to minimize objectionable gas phase reactions under these circumstances, the oxygen containing stream may be diluted to some extent with a combustible gas, thus allowing a portion of the oxygen contained therein to burn said gas prior to contacting the carbon surface, but allowing enough free oxygen to remain therein to heat the carbon surface up to a temperature of the order of at least about 2000° F. For this purpose there may be employed liquid hydrocarbons without substantial preheating, if any, or high molecular weight hydrocarbon substances such as, for example, various tars and heavy oils may be used. The latter materials, however, should be preheated at least to the extent that they are readily flowable.

What I claim is:

1. In an apparatus for the production of hydrocarbon conversion products at elevated temperature the combination comprising a reaction chamber, means within said chamber for supporting a massive carbon body, said means being of substantially smaller exterior diameter than the internal diameter of said chamber, means within said chamber for lowering the temperature of the products produced in said chamber and means for introducing reactant gases directly onto the surface of said carbon.

2. In an apparatus for the production of hydrocarbon conversion products at elevated temperature, the combination comprising a reaction chamber, means within said chamber for supporting a massive carbon body, said means being of substantially smaller exterior diameter than the internal diameter of said chamber, means spaced centrally of said reaction chamber for introducing reactant gases directly onto the surface of said carbon and means within said chamber for lowering the temperature of the products produced therein, said temperature-lowering means substantially surrounding said gas introducing means.

3. In an apparatus for the production of hydrocarbon conversion products at elevated temperature the combination comprising a reaction chamber, means within said chamber for supporting a massive carbon body, said means being of substantially smaller exterior diameter than the internal diameter of said chamber, a channel passing through said supporting means and communicating at its upper end with said reaction chamber, said upper end being tapered, means within said chamber for lowering the temperature of the products produced in said reaction chamber, means for introducing reactant gases directly onto the surface of said carbon, means for continuously feeding loose, finely divided carbon aggregate into said channel, and means for conveying said aggregate through said channel and toward the tapered end thereof.

4. In a process for effecting the high temperature conversion of hydrocarbon gases into products of greater reactivity in a reaction zone, the steps which comprise bringing a hydrocarbon gas into contact with a massive carbon surface while the latter is at a temperature of at least about 2000° F., allowing said hydrocarbon gas to remain in contact with said massive carbon in the absence of free oxygen until the temperature thereof is not less than about 1600° F., and thereafter contacting said carbon surface with a gas containing free oxygen to bring the temperature of said carbon up to at least about 2000° F.

5. In a process for effecting the high temperature conversion of hydrocarbon gases into products of greater reactivity in a reaction zone, the steps which comprise bringing a hydrocarbon gas into contact with a massive carbon surface while the latter is at a temperature of at least about 2000° F., allowing said hydrocarbon gas to remain in contact with said massive carbon in the substantial absence of free oxygen until the temperature thereof is not less than about 1600° F. (withdrawing the resulting gas mixture from said zone), and thereafter contacting said carbon surface with a gas containing free oxygen to bring the temperature of said carbon up to at least about 2000° F.

6. In a process for effecting the high temperature conversion of a hydrocarbon gas into acetylene, the steps which comprise contacting said hydrocarbon gas with a massive carbon surface in a reaction zone while said carbon is at an initial temperature of at least about 2000° F., feeding said hydrocarbon gas to the said reaction zone and bringing said gas into contact with said carbon in the substantial absence of free oxygen until the temperature of the latter is not less than about 1600° F., quenching the resulting products of combustion in a zone immediately adjacent said reaction zone, and thereafter contacting said carbon with a gas containing free oxygen to bring the temperature of said carbon up to at least about 2000° F.

7. In a process for effecting the high temperature conversion of hydrocarbon gases into products of greater reactivity in a reaction zone, the steps which comprise flowing a hydrocarbon gas onto a massive carbon surface initially heated to a temperature of at least about 2000° C., continuing the contact of said gas wit hsaid massive carbon surface in the substantial absence of free oxygen until the temperature of the latter is not less than about 1600° F., and thereafter contacting said carbon surface with air to bring the temperature of said carbon up to at least about 2000° F.

8. In a process for effecting the high temperature conversion of hydrocarbons into products of greater reactivity, the steps which comprise simultaneously injecting streams of liquid hydrocarbon and a gas containing free oxygen onto the surface of massive carbon, the liquid hydrocarbon contacting a portion of said surface which is at a temperature of at least 2000° F. and continuing said contacting until the temperature of said portion of said surface is below about 1600° F., and directing said stream of gas containing free oxygen to a point on said surface directly behind the area in which cracking of said hydrocarbon last occurred until the surface on which the stream of said gas containing free oxygen is directed reaches a temperature of at least about 2000° F., said streams having a velocity sufficiently high to avoid the occurrence of appreciable gaseous-phase oxidation reactions.

9. In a process for effecting the high temperature conversion of hydrocarbons into products of greater reactivity, the steps which comprise injecting liquid hydrocarbon into a massive carbon body, the surface of which is at a temperature of at least about 2000° F., allowing said hydrocarbon to diffuse to the surface of said carbon body, whereby conversion of said hydrocarbon to acetylene occurs in the substantial absence of free oxygen until the temperature in the immediate zone in which cracking occurs falls to about 1600° F., and thereafter contacting said zone with a gas containing free oxygen to bring the temperature thereof up to at least about 2000° F.

References Cited in the file of this patent

UNITED STATES PATENTS

| Number | Name | Date |
|---|---|---|
| Re. 19,794 | Banck | Dec. 24, 1935 |
| 1,023,783 | Knapp | Apr. 16, 1912 |
| 1,773,611 | Banck | Aug. 19, 1930 |
| 1,892,559 | Hillhouse | Dec. 27, 1932 |
| 2,080,767 | Dreyfus | May 18, 1937 |
| 2,261,319 | Wilcox | Nov. 4, 1941 |
| 2,405,395 | Bahlke et al. | Aug. 6, 1946 |
| 2,436,282 | Bennett | Feb. 17, 1948 |
| 2,526,696 | Schutte | Oct. 24, 1950 |
| 2,543,742 | Evans | Feb. 27, 1951 |
| 2,549,240 | Robinson | Apr. 17, 1951 |
| 2,552,277 | Hasche | May 8, 1951 |